US008468492B1

(12) United States Patent
Frenkel

(10) Patent No.: US 8,468,492 B1
(45) Date of Patent: Jun. 18, 2013

(54) SYSTEM AND METHOD FOR CREATION AND MODIFICATION OF SOFTWARE APPLICATIONS

(75) Inventor: Benjamin A. Frenkel, Cambridge, MA (US)

(73) Assignee: Pegasystems, Inc., Cambridge, MA (US)

( * ) Notice: Subject to any disclaimer, the term of this patent is extended or adjusted under 35 U.S.C. 154(b) by 590 days.

(21) Appl. No.: 12/798,161

(22) Filed: Mar. 30, 2010

Related U.S. Application Data

(60) Provisional application No. 61/164,738, filed on Mar. 30, 2009.

(51) Int. Cl.
G06F 9/44 (2006.01)
(52) U.S. Cl.
USPC ............ 717/104; 717/105; 717/106; 717/109
(58) Field of Classification Search
None
See application file for complete search history.

(56) References Cited

U.S. PATENT DOCUMENTS

| 8,001,519 B2* | 8/2011 | Conallen et al. | 717/105 |
| 2006/0064667 A1* | 3/2006 | Freitas | 717/104 |
| 2006/0101386 A1* | 5/2006 | Gerken et al. | 717/106 |
| 2006/0101393 A1* | 5/2006 | Gerken et al. | 717/109 |
| 2008/0189679 A1* | 8/2008 | Rodriguez et al. | 717/105 |
| 2008/0196003 A1* | 8/2008 | Gerken et al. | 717/106 |
| 2008/0263510 A1* | 10/2008 | Nerome et al. | 717/104 |
| 2009/0007084 A1* | 1/2009 | Conallen et al. | 717/146 |
| 2009/0083697 A1* | 3/2009 | Zhang et al. | 717/105 |
| 2009/0138844 A1* | 5/2009 | Halberstadt et al. | 717/104 |
| 2009/0282384 A1* | 11/2009 | Keppler | 717/104 |
| 2010/0011338 A1* | 1/2010 | Lewis | 717/105 |

OTHER PUBLICATIONS

Mohamed Fayad et al., "Object-Oriented Application Frameworks", Oct. 1997 Communications of the ACM, pp. 32-38, <http://dl.acm.org/citation.cfm?id=262798>.*
Tamar Richner et al., "Recovering High-Level Views of Object-Oriented Applications from Static and Dynamic Information", 1999 IEEE, 10 pages, <http://ieeexplore.ieee.org/stamp/stamp.jsp?tp=&arnumber=792487>.*
Allen Bierbaum et al., "VR Juggler: A Virtual Platform for Virtual Reality Application Development", 2001 IEEE, 8 pages, <http://ieeexplore.ieee.org/stamp/stamp.jsp?tp=&arnumber=913774>.*
Carlos Lucena et al., "Object Oriented Framework Development", 2001 ACM, 13 pages, <http://dl.acm.org/citation.cfm?id=372771>.*
Brigitte Pientka et al., "Programming with Proofs and Explicit Contexts", 2008 ACM, pp. 163-173, <http://delivery.acm.org/10.1145/1390000/1389469/p163-pientka.pdf?>.*
D. T. Chang et al., "Object persistence in object-oriented applications", 1997 IBM Systems Journal, pp. 66-87, <http://ieeexplore.ieee.org/stamp/stamp.jsp?tp=&arnumber=5387186>.*

* cited by examiner

Primary Examiner — Thuy Dao
Assistant Examiner — Cuong V Luu
(74) Attorney, Agent, or Firm — Muirhead and Saturnelli, LLC

(57) ABSTRACT

Described herein is a system comprising an App Generator (application generator) comprising executable program instructions that define one or more constraints. The one or more constraints embody one or more rules for converting an information structure into one or more components of a software application. The system also includes a digital data processor executing said executable program instructions to: i. provide a user interface; ii. accept input data that defines the information structure; and iii. apply the one or more constraints to said input data to generate the one or more components of the software application.

18 Claims, 6 Drawing Sheets

SYSTEM AND METHOD FOR CREATION AND MODIFICATION OF SOFTWARE APPLICATIONS

CROSS-REFERENCE TO RELATED APPLICATIONS

This application claims the benefit of priority of U.S. Provisional Patent Application Ser. No. 61/164,738, filed Mar. 30, 2009, and entitled "A software system for creating a computer managed workflow," the teachings of which are incorporated herein by reference.

TECHNICAL FIELD

The invention relates to digital data processing and, more particularly, to software development systems and methods. The invention has application, by way of non-limiting example, to accelerating the creation and modification of software applications that comprise one or more workflows.

BACKGROUND

The traditional way for creating a software application has required many skilled workers such as a database administrator, UI designer, programmers as well as the process architects and business users that understand the workflow. Months of work are usually required to develop, test, and deploy even the simplest of workflow automation applications.

Recently, model-driven development (MDD) tools have incrementally improved this process, allowing users to describe each step of a workflow explicitly in a diagramming tool such as Microsoft Visio or equivalent software program, and much of the coding and user interface development is automated. The MDD tools have sped development up incrementally, in some cases up to 70 percent faster than the aforementioned traditional method. Yet much of the development of a software application is redundant because an application's structure is constrained by the data the workflow is designed to capture and display.

In view of the foregoing, an object of the invention is to provide improved methods and system for digital data processing.

A related object is to provide such methods and apparatus as can be used to build new software applications as well as modify existing software applications.

A further related object of the invention is to provide such methods and apparatus as can be used by both skilled and unskilled users to rapidly build and modify software applications without even seeing a line of code.

Yet a still further object of the invention is to provide such methods and apparatus as can be implemented and operated at reduced expense on existing and new platforms.

SUMMARY OF THE INVENTION

The foregoing are among the objects attained by the invention which provides, in some aspects, a system comprising an App Generator (application generator). The App Generator further comprises executable program instructions that define one or more constraints, wherein said one or more constraints embody one or more rules for converting an information structure into one or more components of a software application. The system includes a digital data processor executing said executable program instructions to: i. provide a user interface; ii. accept input data that defines the information structure; iii. apply the one or more constraints to said input data to generate the one or more components of the software application. The one or more components for the software application may include any of one or more workflows, one or more user interfaces and one or more database tables and columns. The information structure may be a hierarchical data structure.

Such a system can include one or more elements of the systems described above.

In other aspects, the invention provides methods that parallel operation of the systems described above and can be used to create and/or modify software applications.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

An insight of this invention is that by analyzing the structure of the information the application is intended to capture and process, a functional workflow can be effectively generated to capture that information, including all necessary user interface and database components.

Furthermore, the interface for capturing the information structure from the unskilled user who wants to build a software application also requires its own development process. Workflow automation and MDD companies go through the traditional software method described previously to update and maintain their software development environment.

The invention described herein allows for the rapid evolution of the information structure design workflow because it is itself generated from an information structure, which will be called the "meta-information structure" heretofore.

Automating the continued development of the data structure workflow can provide a significant advantage to a software company that employs the techniques described herein to its platform, allowing for the quick addition of new features.

Figure 1:
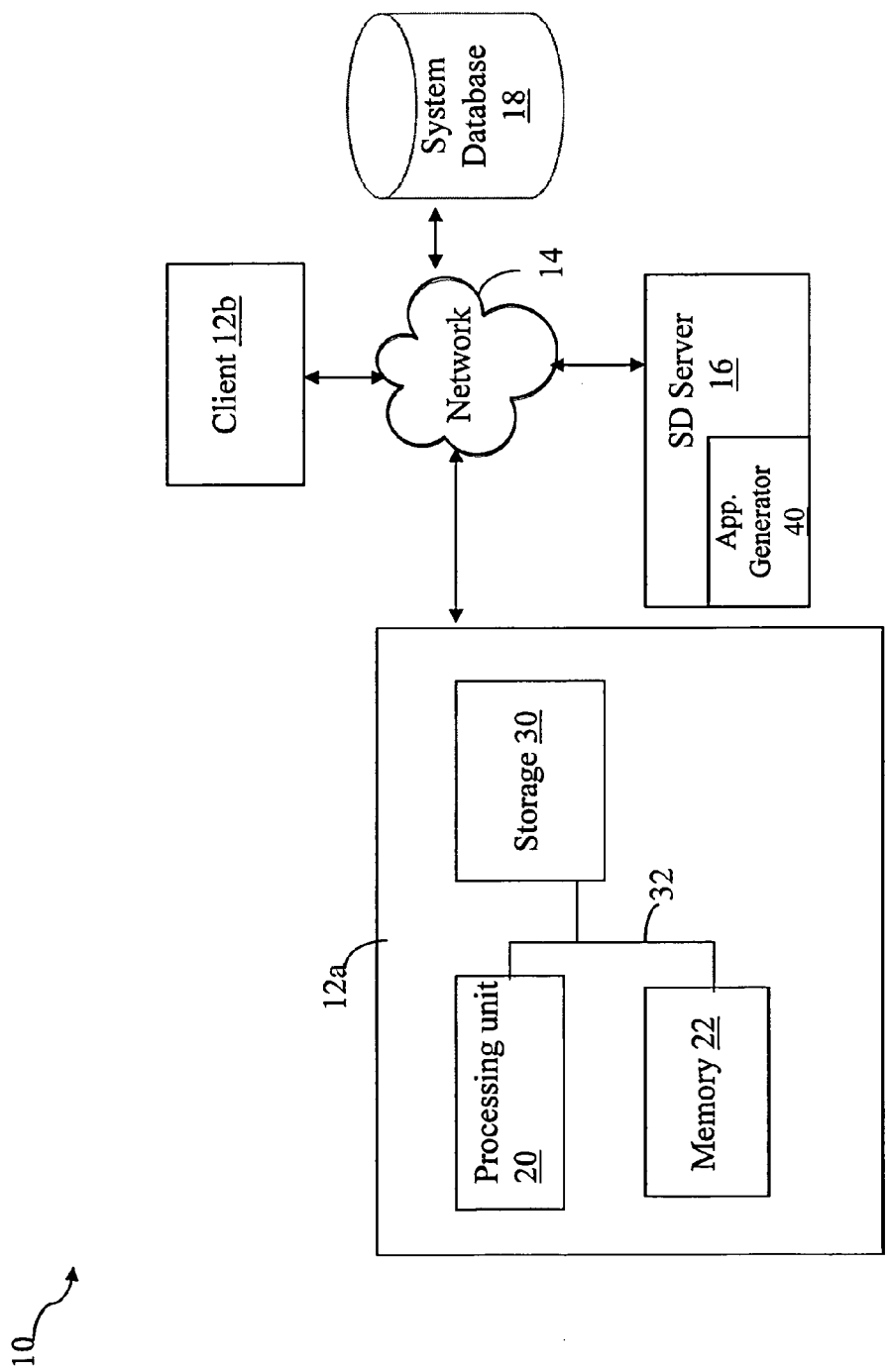
FIG. 1 depicts a digital data processing system of the type in which the invention is practiced.

FIG. 1 depicts a digital data processing environment in which embodiments of a software development system 10 utilizing the techniques described herein may be implemented. This includes a SD server digital data processor 16 that is coupled to client digital data processors 12a, 12b via the Internet, a wide area network (WAN), metropolitan area network (MAN), local area network (LAN), telephone networks and/or a combination of these and other networks (wired, wireless, public, private or otherwise)—all indicated here by the element 14

The illustrated digital data processors 12a, 12b and 16 comprise personal computers, blade PCs, work stations, mainframes, personal digital assistants (PDAs), mobile phones, embedded processors and/or other digital data apparatus of the type known in the art, one or more of which can be adapted for operation in accord with the teachings hereof. Here, those digital data processors are of the type and configuration used in a thin client computing environment, i.e., with an application server (e.g., 16) providing a majority of the processing and other functionality to one or more client devices (e.g., 12a,12b) via network(s) 14; however, the invention may be practiced in any variety of other computing environments, networked or otherwise. By way of non-limiting example, the software development system 10 may be based on thick client principles where all of the functionality and resources utilizing the techniques described herein are provided and/or utilized by a single digital data processor (e.g., SD server 16) that is networked or otherwise. Examples of other well known computing environments include, but are not limited to, rich client environments where a networked digital data processor (e.g., 12a, 12b and 16) has some components and software installed locally but also uses resources and/or functionality distributed over a network. Still further examples of computing environments in which the invention may be practiced include cloud computing and other distributed and virtual computing environments.

The techniques set forth herein may be described in the general context of computer-executable instructions, such as a computer program product or program modules (collectively, "computer programs"), accessible from a computer-usable or computer-readable medium providing program code for use by or in connection with a digital data processor (e.g., 12a, 12b, 16) or any instruction execution mechanism. Generally, computer programs include routines, objects, components, data structures, and the like, that are designed to perform particular tasks. Typically the functionality of the computer programs may be combined or distributed as desired in various embodiments. For the purposes of this description, a computer-usable or computer readable medium may include any apparatus that can store, communicate, propagate, or transport the computer program for use by or in connection with a digital data processor or instruction execution system.

The medium may be, but is not limited to, electronic, magnetic, optical, or electromagnetic. Examples of computer-readable mediums include, but are not limited to, magnetic tape, a removable computer diskette, a random access memory (RAM), a read-only memory (ROM), EEPROM, flash memory, a rigid magnetic disk and an optical disk. Current examples of optical disks include CD-ROM, CD-R/W and DVD.

As illustrated in FIG. 1, the digital data processor 12a may include one or more processing units 20, memory 22, storage 30, and a system bus 32 used to facilitate communications between the components of the computer 12a, as well as other components not illustrated in FIG. 1. The computer 12b and SD server 16 may also include components similar to those as illustrated and included in the computer 12a. Each of the processing systems 12a, 12b and 16 are capable of storing and/or executing computer programs. The memory 22 may be volatile (such as RAM), non-volatile (such as ROM, flash memory, etc.) or some combination of the two. It may include local memory employed during actual execution of the computer program as well as cache memories which may provide temporary storage of at least some of the computer program instructions or related data in order to reduce the number of times that the code or data has to be retrieved from bulk storage 30 (e.g., USB devices, magnetic or optical disks, tape, etc.). By way of example, and not limitation, memory 22 and storage 30 are both examples of computer-readable media as described above.

The digital data processors 12a, 12b and 16 may be coupled to each other or external storage devices (e.g., system database 18) through intervening networks (e.g., 14) through the use of network adapters (not shown in FIG. 1). Modems, cable modems and Ethernet cards are examples of currently available network adapters. Furthermore, Input/Output devices (e.g., keyboards, displays, pointing devices, etc), also not shown in FIG. 1, can be coupled to the digital data processors 12a, 12b and 16 either directly or through intervening I/O controllers.

Described in more detail in following paragraphs and figures is processing that may be performed by computer programs executed by the computers 12a, 12b and SD server 16 in connection with using the techniques described herein. In the illustrated embodiment, digital data processors 12a, 12b are client computers which communicate with the SD server 16 over the network 14. The computers 12a, 12b may include a web browser or other software for use in connection with rendering a user interface (UI) that may be used in connection with viewing and performing other operations on data requested, and received from, the SD server 16. The web browser and UI may also be used to transmit data to SD server 16 for processing by the SD server 16. Each of the clients 12a, 12b may operate independently of each other in connection with performing different operations on data obtained from the server 16. The SD server 16 and client computers 12a, 12b may utilize the techniques described herein to create and/or modify software applications that comprise one or more workflows. In addition to the internal memory and storage of digital data processors 12a, 12b and 16, the software development system 10 may also utilize an external database system 18 to store and access data that is generated and/or processed by the digital data processors. Examples of external database systems that may be used include, but are not limited to, Microsoft Access, Microsoft SQL server, IBM DB2, Informix, Oracle and Sybase.

Figure 2:
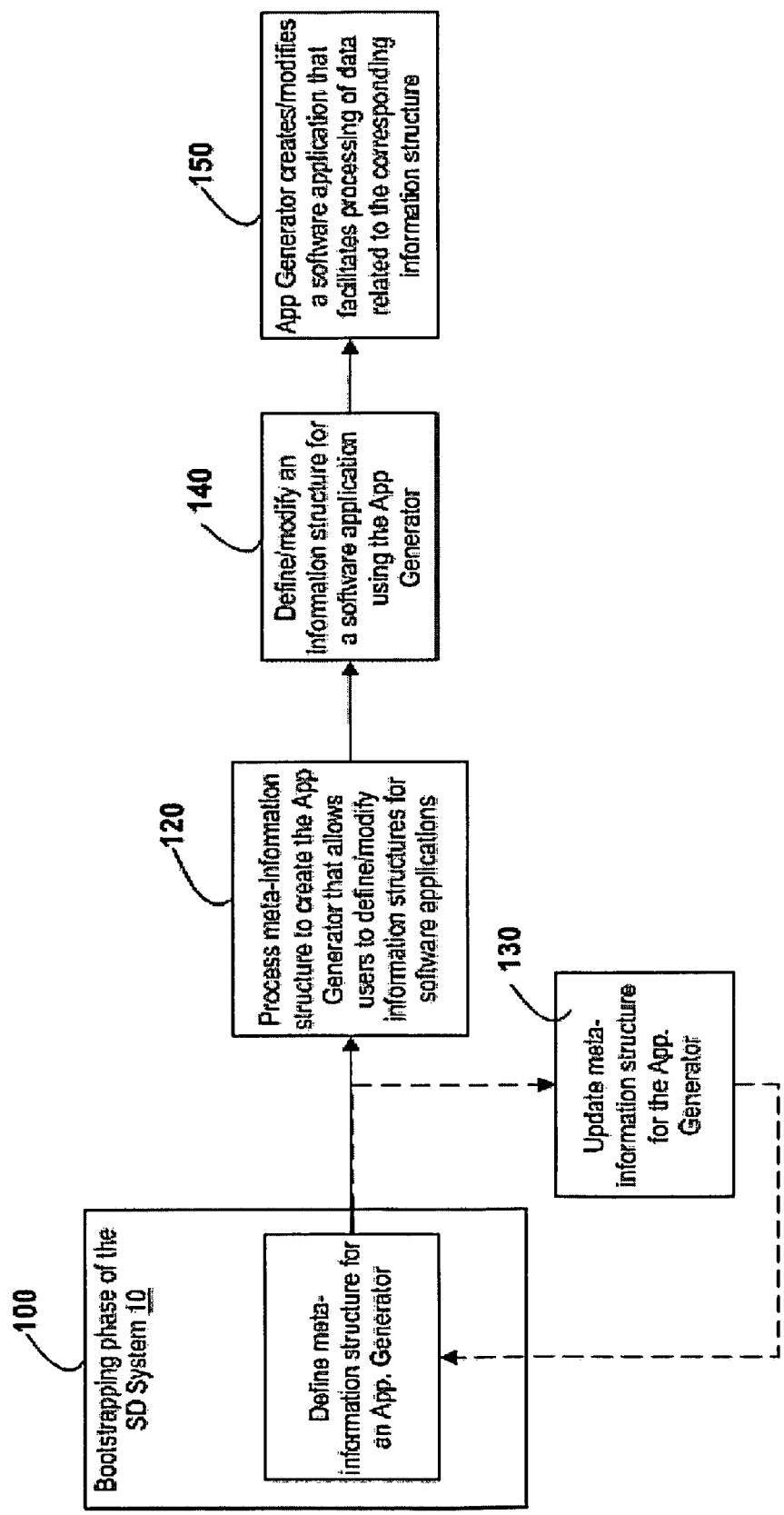
FIG. 2 is a flow chart depicting a method of operation of the software development system of FIG. 1.

FIG. 2 is a flow diagram depicting a method of operation of the software development system 10. During the bootstrapping phase of step 100, a skilled user (e.g., a system administrator or a developer) defines a 'meta-information structure' using any programming language. This meta-information structure is stored as a data file in a location accessible from the SD server 16 (e.g., system database 18 or the internal storage of SD server 16). Generally speaking, during operation of software development system 10 in the illustrated embodiment, a user may continue to update and refine the meta-information structure in an iterative fashion by repeating steps 100 and 130. In order to update the meta-information structure in step 130, a user may access the meta-information structure data file from its storage location (e.g., on SD server 16 or system database 18) by signaling a request (e.g., by way of HTTP/HTTPS requests) using a thin client (e.g. web browser) user interface of any of client devices 12a, 12b. Upon receiving the request, the SD server 16 will transmit the data file back to the requesting client (e.g., 12a). User of the requesting client device can then update the meta-information structure and transmit the update file back to the SD server 16 for storage using the same thin client interface. It will be appreciated that the thin client browser-based interface is illustrative only and that the software development system 10 may use a variety of different user interfaces (e.g., thick client user interface executing non SD server 16) to access and update the meta-information structure.

Once the meta-information structure is finalized, a user may signal (e.g., using the thin client interface of client 12a) SD server 16 to process the meta-information structure in step 120 to create an application generator (hereinafter, "App. Generator") component (shown as element 40 in FIG. 1). Processing may include compilation, just-in-time (JIT) compilation or interpretation of the meta-information data file, depending upon the programming language used to create the file. Furthermore, the processing may be performed using a SD server-based compiler, interpreter or a virtual machine depending upon the specific processing mechanism (e.g., compilation, interpretation or JIT compilation) and the computing environment of the software development system 10.

Regardless of the specific technology employed by SD server 16 to process the meta-information structure in response to signaling by client 12a, the end result of such processing in step 120 is an executable computer program, the App Generator (shown as element 40 in FIG. 1), that can be used in steps 140, 150 to create and/or modify software applications (comprising workflows, database and user interface components) by using information structure definitions for such software applications as input to the App Generator 40. In creating/modifying software applications, the App. Generator 40 applies one or more constraints that embody one or more rules related to the conversion of the information structure into one or more components of a software application. Such components may include process definitions, user interface layout and configuration, database components, security settings (e.g., privileges for viewing, creating, updating and deleting data elements) and the types of integration that may be supported by the software application (e.g., SOAP, database queries etc.). Furthermore, the meta-information structure may dictate the types of processing that can be done at various stages of the process definitions (e.g., process step transitions, creating instances of objects, cloning objects, updating objects, deleting objects, logging on/off of an application etc.). All or some of such default settings and configurations specified by the constraints in the meta-information structure may be overridden in the information structure definitions for each individual software application that is generated using the App. Generator.

The App Generator may be implemented in a single computer program or a combination of multiple software modules. Though, in the illustrated embodiment in FIG. 1, App. Generator 40 executes on SD server 16, in other embodiments, the App. Generator 40 may execute on or over multiple digital data processors.

Figure 3:
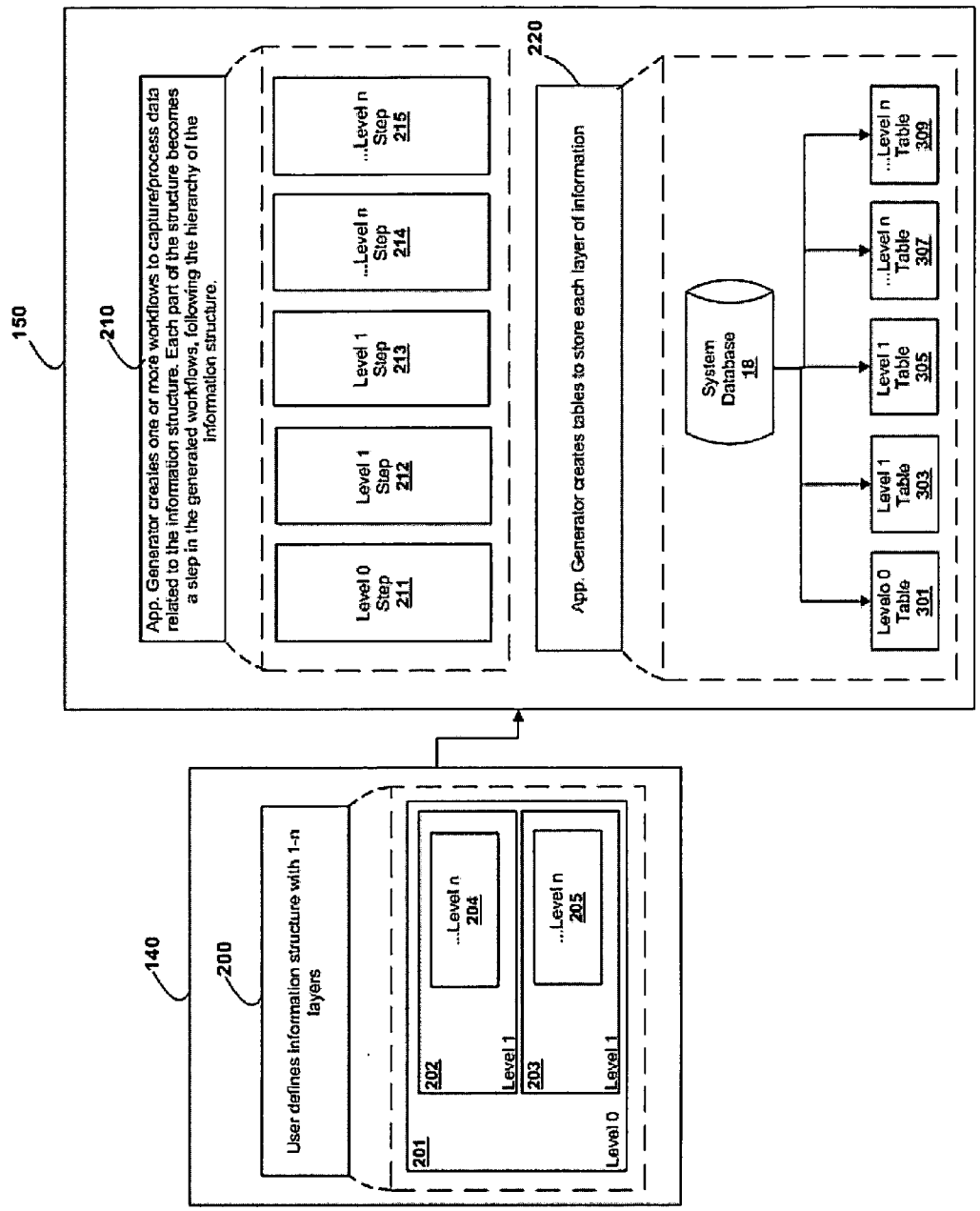
FIG. 3 is a block diagram depicting further details of steps 140, 150 in FIG. 2.

FIG. 3 is a block diagram depicting further details of steps 140, 150 in FIG. 2. In step 140 of the illustrated embodiment, a user defines an information structure 200 for a software application. This information structure 200 comprises a hierarchical data structure that defines the data entities (e.g., 201-205) that will be captured and/or processed by the software application during its execution. The information structure 200 also defines the relationship between such data entities as well as formulas and/or expressions for calculating the values of such data entities, if applicable. Finally the information structure may define certain high-level configuration information related to the administrative functionality and overall user interface layout of the software application (e.g., administrative login information, setting to display a navigation bar on the user interface for the application etc.). This high-level configuration information specified in the information structure of each application may override configuration specifications in the meta-information structure that are applied to all software applications that are created and/or modified using the App. Generator 40, as mentioned previously.

In the illustrated embodiment, the information structure 200 is created and stored as an XML file at a location that is accessible from the SD server 16 (e.g., system database 18 or locally on SD server 16). In order to begin creating the XML file using the App Generator 40, a user may signal the SD server 16 (e.g., by way of HTTP/HTTPS requests) using a thin client interface (e.g., web browser) to execute the App Generator 40. Upon receiving the execution signal from client 12a, the SD server 16 executes the computer executable instructions of the computer program that implements the App. Generator 40. As a result of this execution, a user interface (e.g., see element 500 in FIG. 5) is displayed in the web browser of client 12a that allows a user to create and edit XML documents using an easy-to-use graphical interface rather than manually writing XML code. It will be appreciated that this technique of graphically manipulating the XML document is not a limitation, but only helps accelerate the software development process. A programmer or a skilled user may prefer to manually create and/or edit the information structure by writing XML code and provide the XML file to the SD server 16 using a file upload feature.

Figure 6:
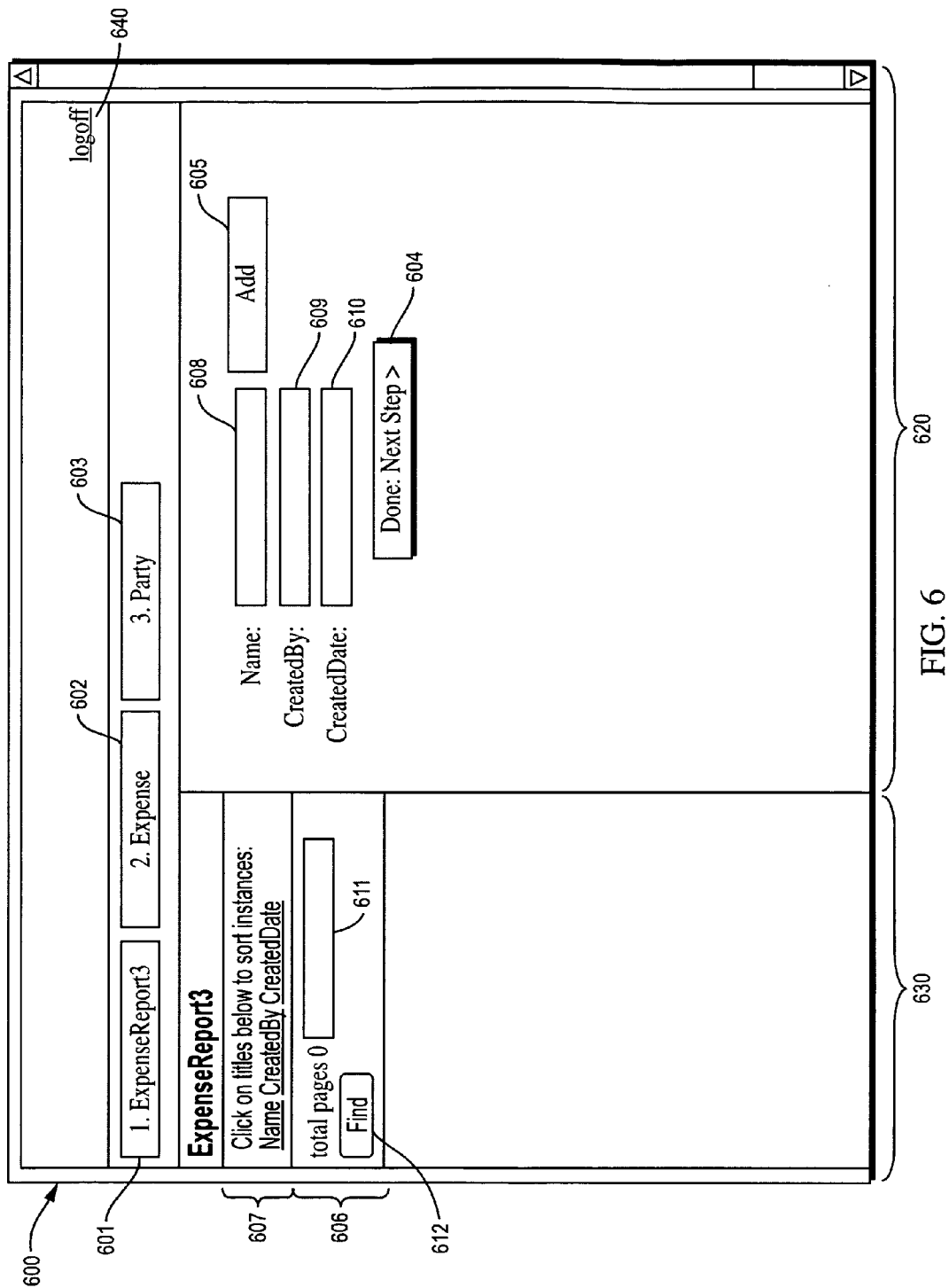
FIG. 6 is an example of a step in a workflow of a software application that is automatically generated using the systems and methods described herein.

Once the information structure for the software application is defined and provided to the App. Generator 40 in step 140, the App. Generator parses the XML file to automatically generate the corresponding software application by constructing a model of a process in step 150. In the illustrated embodiment, the App. Generator 40 stores the process model as a Java object consisting of an array of steps (e.g., 211-215). A series of one or more steps may comprise a single workflow and the software application may include one or more workflows. Each step of a workflow comprises one or more data fields and process actions. A data field may be an attribute that is either input by the software application's end user through a user interface (e.g., input field on a web page) or its value may be set by a function/expression. A process action may be specification of a trigger event for process state transitions (e.g., moving from one state to another). Such events may include modifications to the values of data fields captured at each step (e.g., creating, reviewing, updating and deleting values of data instances), user actions with respect to the user interface displaying a particular step in a workflow (e.g., making a selection, clicking a button, tabbing in/out of fields etc.). Such process actions may be used by the App. Generator 40 to configure certain elements of the user interface for workflow steps (e.g., buttons 604 and 605 of screen 600 as shown in FIG. 6).

As an example of how the App. Generator may parse the information structure to generate a process model of a software application, consider the following pseudo-code (A), in which tags with a type attribute set to "complex" generate workflow steps and each tag with a type attribute set to "simple" generates a data field to be captured as part of the parent step. Further, "simple" tags are always embedded within "complex" tags.

PSEUDO CODE EXAMPLE A

```
<ExpenseReport type="complex">
    <Name type="simple"/>
    <CreatedDate type="simple"/>
    <CreatedBy type="simple"/>
    <Expense>
```

-continued

PSEUDO CODE EXAMPLE A

```
        <Amount type="simple"/>
        <Description type="simple"/ >
        <Party>
            <Name type="simple"/>
            <Surname type="simple"/>
        </Party>
    </Expense>
</ExpenseReport >
```

Such rules about the hierarchical layout of the "simple" and "complex" tags in an information structure for an application, and how such tags are converted into steps and data fields for the software application, are embodied in constraints that are specified in the meta-information structure. The App Generator 40 applies such rules when parsing information structures to generate software applications.

By way of non-limiting example, for pseudo-code (A) above, the process used by the App. Generator 40 to parse the XML begins at the highest level 0 (e.g., element 201) of the information structure, i.e., the ExpenseReport tag. Because the ExpenseReport tag is at the highest level and of type "complex", the App. Generator 40 creates a process object (i.e. workflow), the first step of which captures the data fields related to the ExpenseReport step. The App. Generator 40 then traverses the children of ExpenseReport with a type attribute set to "simple," Name, CreatedDate and CreatedBy. The App. Generator 40 converts these tags into data fields of the ExpenseReport step. Next, the App. Generator 40 traverses to the next complex data structure Expense at the next level (e.g., 202, 203) and generates the second step of the process. Applying the same constraints as those mentioned above, the App. Generator 40 traverses the "simple" tags embedded within the parent Expense tag i.e., Amount and Description. Again, applying the rules embodied in the constraints that are applied during this XML parsing, the App. Generator 40 converts these "simple" tags into data fields of the Expense step in the workflow. Additionally, the App. Generator 40 processes the Party tag, which is a child of the Expense tag at the same Level as elements 204, 205 in FIG. 3. As the Party tag's type attribute is "complex", the App. Generator 40 creates a third step in the process to capture the Party information. Finally, the App. Generator 40 moves to the children tags of Party i.e., Name and Surname. Because type attribute for tags Name and Surname are set to "simple", the algorithm converts the tags to data fields on the Party step.

In addition to creating the process model of the software application, in step 150 (and sub-step 220 as shown in FIG. 3) the App Generator 40 also creates the database components that are necessary to support data processing during execution of the generated software application. Such components comprise, for example, database tables for each complex object (or tag) and columns for each simple object (or tag) as specified in the information structure for the software application. The database components may be generated in the system database 18 (as shown in FIG. 1) or any other database that is in communication coupling with the App. Generator 40 at the time when the software application is first executed. In the illustrated embodiment, the database components are not generated prior to the first execution of the software application in order to avoid repeated creation and deletion of database components while the information structure for the application is being finalized. However, it will be appreciated that, in other embodiments, database components may be generated at various different times during the software application development process.

Figure 4:
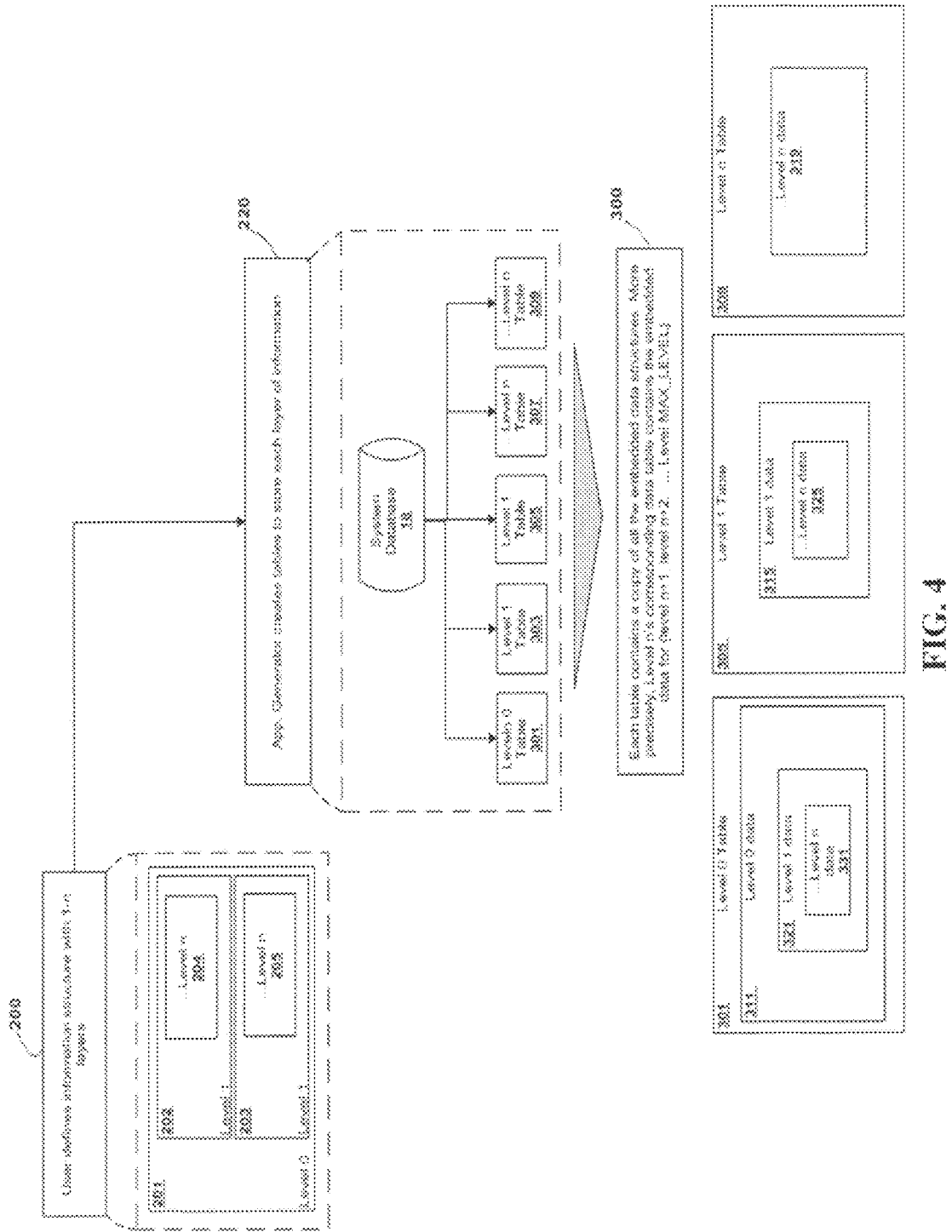
FIG. 4 is block diagram depicting further details of the database components that may be generated using systems and methods described herein.

FIG. 4 provides further details of the database components that may be generated using the methods and apparatus described herein. Generally speaking, using the exemplary pseudo-code (A) mentioned above, the App. Generator 40 may create the database components for the ExpenseReport3 workflow as follows. First, upon execution o the ExpenseReport3 workflow for the first time, the App Generator 40 creates a Level 0 Table (e.g., 301) for the ExpenseReport object with columns Name, CreatedDate and CreatedBy. Next the App Generator 40 creates a Level 1 Table (e.g., 303, 305) for the Expense object with columns Amount and Description. Finally, the App Generator 40 creates a Level n Table (e.g., 309) for the Party object with columns Name and Surname. In addition to creating the database structure in the illustrated embodiment, the App Generator 40 may add an additional column to each table. This additional column may store values captured for each instance of the objects during execution of the software application. In one embodiment, the structure of this additional column may also follow the same hierarchy as that defined in the information structure for the application, such that the additional column in Level 0 tables will store the values of the instances of all sub-level Tables 1-n. This is illustrated in FIG. 4 by elements 311, 321 and 331 for Table 0.

Again using the database structure for the ExpenseReport3 workflow as an example and assuming that a single instance of the ExpenseReport object has been created with a single instance of Expense and Party objects created within the ExpenseReport object. The additional column in database table for ExpenseReport instance will store the values for all 3 instances i.e. ExpenseReport, Expense and Party. The additional column in database table for Expense instance will store the values for the Expense and Party instance, whereas the table for the Party object will only store values for instances of the Party object. It will be appreciated that the overall database structure is illustrative only and by no means limits the methods and apparatus described herein with regard to the automatic generation of database components.

Figure 5:
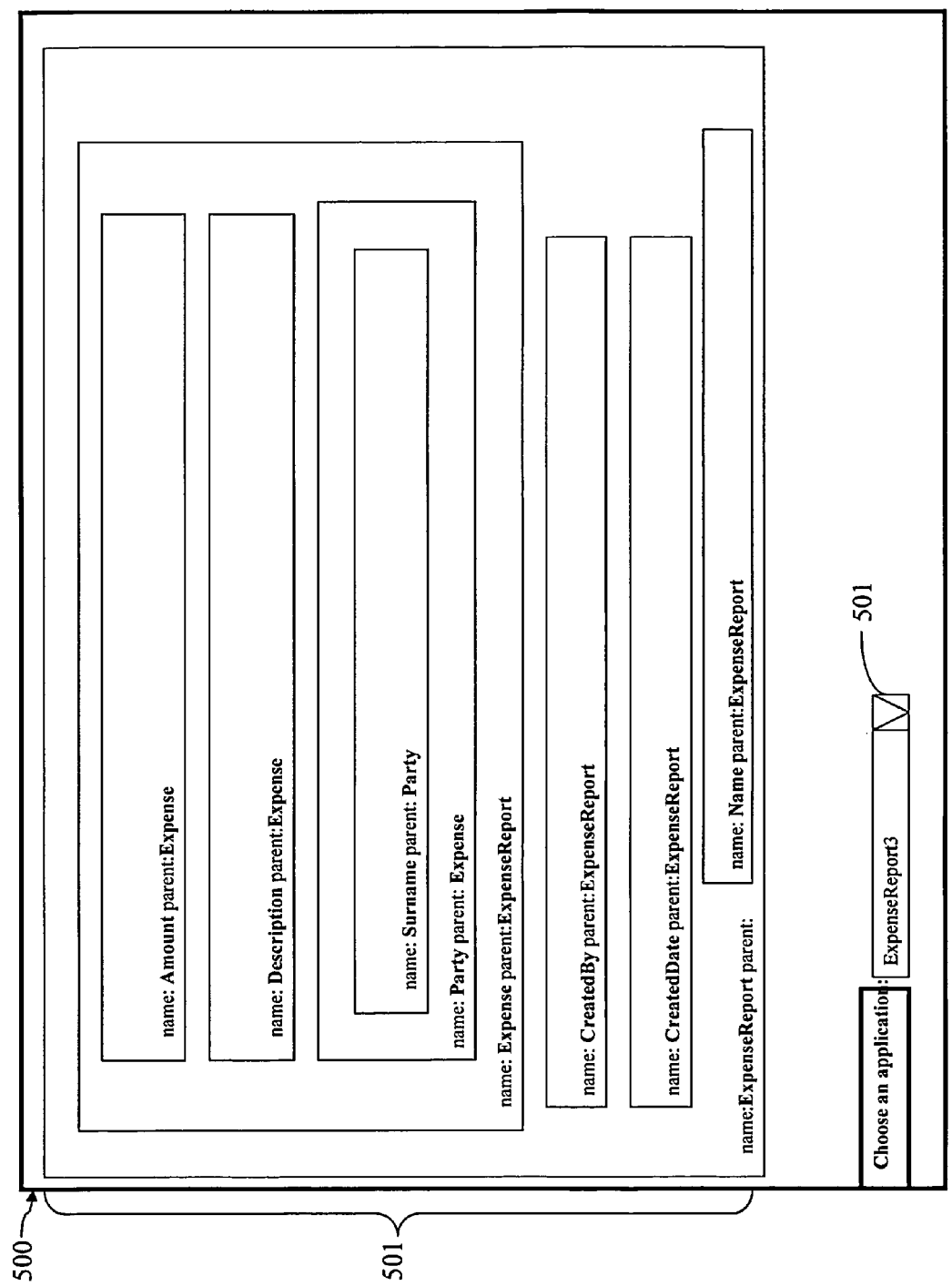
FIG. 5 is an example of a user interface for the App. Generator of FIG. 1.

Referring now to FIG. 5, an exemplary user interface 500 is shown for the App. Generator 40 as shown in FIG. 1. As mentioned above, in the illustrated embodiment, a software development system 10 is provided and is operable to be displayed in a thin client user interface on client computer 12a. During operation of software development system 10, a user may signal a request through client device 12a (e.g., by way of HTTP/HTTPS requests) for the user interface 500 to be transmitted to the client device 12a for display/execution by its web browser. That web browser is of the conventional type known in the art operative on the client device 12a for, by way of example, retrieving screen definitions, presenting those screens (visually, aurally, or otherwise), executing scripts, controls and other code on those screens, accepting user input with respect to those screens (e.g., for purposes of completing input fields), issuing HTTP/HTTPS requests with respect to those screens or otherwise (e.g., for submitting to a server information from the completed input fields), and so forth. The screens (e.g., web pages) can be defined using code scripts in HTML or other conventional forms, including embedded XML, Javascripts, controls, and so forth—again, per convention in the art.

In response to the user request from client 12a, the SD server 16 retrieves the one or more code scripts that define user interface 500. These scripts are part of the computer program that implements the App Generator 40, and are either stored directly on the SD server 16 or at another location (e.g., system database 18) that is accessible to the SD server 16. The SD server 16 processes those code scripts to generate the markup language stream that is rendered in the browser of client 12*a* to display the user interface 500. It will be appreciated that the user interface 500 is illustrative only and the App. Generator 40 may utilize a variety of different user interfaces to allow users to interact with itself and/or the SD server 16.

Systems and methods according to the invention facilitate rapid development and/or modification of software applications without writing a single line of code.

This is depicted, by way of non-limiting example, in FIG. 5, in which section 501 of the user interface 500 is shown to graphically display the information structure for an application ExpenseReport3 that uses the workflow mentioned above. Users can use this graphic display mechanism to review the information structure definition for existing applications that are stored on (or accessible to) SD server 16. A user simply selects a pre-existing application (e.g., ExpenseReport3) from drop-down 501 and the corresponding information structure is displayed in section 501 of the user interface 500. From the information structure display, the user is able to graphically manipulate the information structure, and consequently modify the corresponding software application without writing any code or manipulating any data files. For example, a user can add a new data layer at the appropriate level in the information structure by simply drawing a box in section 501 of the user interface 500. Once the box has been positioned at the appropriate level within the information structure, the user is prompted to enter descriptive information related to the new data layer (e.g., name and parent information). Once the descriptive information has been entered, the client device 12*a* will transmit the information to the SD server 16, which will in turn, automatically update the corresponding software application based upon the constraints applied by the App Generator 40.

By way of non-limiting example, if the user wants to modify the ExpenseReport3 workflow to add a new step to capture the full name and department of an Approving Manager as part of the workflow, the user will simply draw a box at the appropriate level (e.g., same level as Name, CreatedDate, CreatedBy) in section 501. The name and parent information for this new data layer will be Approving Manager and ExpenseReport, respectively. Within this new box for the Approving Manager data layer, the user will also draw two smaller boxes where the parent information for each box will be Approving Manager and the name of each box will be Full Name and Department. In other words, Approving Manager is added as a new 'complex' object type with two 'simple' embedded object types for Full Name and Department in the XML definition of the information structure for the ExpenseReport3 workflow. Once this information is captured and transmitted to SD server 16, the ExpenseReport3 workflow is automatically updated to create a new step for the Approving Manager object with data fields for Full Name and Department. Further details about individual workflow steps and related objects and data fields are provided below as part of the discussion for FIG. 6.

Users can also interact with the App. Generator 40 through user interface 500 to rapidly build new applications. In the illustrated embodiment, a user can signal the App. Generator 40 executing on SD server 16 to build a new application by making the 'New' selection from drop-down 501. Upon making the selection, the user is presented with a pop-up menu to specify the name of the new application. Once the name is entered, screen 500 automatically displays a new box in the graphical display section 501 where the user can start creating the information structure graphically for the new application as described above.

In the illustrated embodiment, the graphical display section 501 is implemented using the <canvas> HTML element in the code scripts for user interface 500. This element allows users to do graphical manipulations (e.g., draw boxes) using scripting (e.g., JavaScript) that may also be embedded in the code scripts for the user interface. Furthermore, this scripting may contain the logic for converting data captured using the graphical user interface into the XML definition of the underlying information structure. It will be appreciated that the use of this HTML element and scripting is illustrative only and does not in any way limit the scope of the invention with regard to the input and manipulation of an information structure for an application using the methods and apparatus described herein. By way of non-limiting example, section 501 may be implemented using different technology (e.g., SVG, Flash etc.) in other embodiments of the invention. Furthermore, a graphical user interface such as section 501 may not be used at all to create and/or modify information structures for software applications. In certain computing environments for the software development system 10 described herein, a user may manually define and/or modify the information structure for an application in an XML or .txt file, which is in turn supplied to the SD server 16 through a file upload facility.

Referring now to FIG. 6, an exemplary screen 600 is shown displaying a step in the ExpenseReport3 workflow. The overall layout and functionality of this screen is automatically generated by the App. Generator based upon the information structure definition for the ExpenseReport3 workflow as well as the constraints that are applied by the App Generator 40 while converting the information structure definition into the software application. The screen 600 may be displayed in the user interface executing on any of client digital data processors 12*a*, 12*b* as described above. The screen 600 further demonstrates a functional implementation of the above mentioned features of an embodiment of the system and methods described herein.

In this embodiment of the screen 600, a user of the ExpenseReport3 application can start creating specific instances of the ExpenseReport object that was defined using the App. Generator 40 user interface as shown in FIG. 5. In the top section of the screen 600, the user can see numbered sections 601, 602, 603 corresponding to each of the steps in the ExpenseReport3 workflow i.e., ExpenseReport, Expense and Party. As shown in FIG. 6, section 601 is highlighted since the user is currently viewing the ExpenseReport step of the workflow. The user can enter information for simple data elements Name, CreatedBy and CreatedDate through input fields 608, 609 and 610, respectively. Each field is by default a text field unless a 'DataType' attribute is specified in the information structure. Once the information is entered, the user can either add another instance of the ExpenseReport object by selecting the 'Add' button 605, or the user can proceed to the next step in the ExpenseReport3 workflow by selecting the 'Done—Next Step' button 604. Selection may be accomplished by single-clicking on the desired button. Both of these buttons represent process actions of the ExpenseReport step, as mentioned previously. Upon proceeding to the next step by selecting button 604, section 602 will be highlighted on top of screen 600 and the user will be prompted to enter information for data fields Amount and Description associated with the Expense step of the ExpenseReport3 workflow. If the user enters multiple instances of the ExpenseReport object prior to proceeding to the next step, the user will be prompted to enter multiple instances of the Expense and Party objects for each entered ExpenseReport object at the corresponding steps in the ExpenseReport 3 workflow.

The content displayed in the main panel 620 keeps changing as the user proceeds through the ExpenseReport3 workflow because the data fields for each step are displayed in the main panel 620. Furthermore, as the user creates instances of the ExpenseReport, Expense and Party objects at each step of the workflow, such instances can be listed in section 607 of the screen 600. Also, users have the option to sort the list of instances based upon the various data fields that are associated with each step in the flow. As shown in section 607 of FIG. 6, the user can view and sort the list of all previously created instances of the ExpenseReport object based upon the Name, CreatedBy and CreatedDate data fields associated with the ExpenseReport step of the flow. Similarly, when the user proceeds to the Expense step of the work flow, section 607 will display a list of the previously entered Expense objects where that list can be sorted based upon the Amount and Description data fields associated with the Expense step. Users may review any of the instances in the main panel 620 by selecting (e.g., through a single-click selection or otherwise) the specific instance in the list in section 607.

Users may also review a particular instance of an object by using the 'Find' section 606 of the screen 600. In the illustrated embodiment, a user can submit a query through the input field 611 by entering a value for any of the data fields and selecting (e.g., through a single-click selection or otherwise) the 'Find' button 612. Queries may be constructed using any unique identifier for any instance of the objects. Finally, user may end the use of the ExpenseReport3 application and log-off the system 10 by selecting (e.g., through a single-click selection or otherwise) the link 640.

In addition to supporting default user interface (UI) generation based on the information structure definition and the constraints specified in the meta-information structure, the methods and techniques described herein may also be used to override default (UI) generation by the App. Generator 40. By way of nonlimiting example, consider the following pseudo-code (B) where the definition of Name data field for the Expense step in the information structure definition for the ExpenseReport3 workflow has been changed to a drop-down list with a pre-defined list of values.

---

PSEUDO CODE EXAMPLE B

```
<ExpenseReport type="complex">
    <Name type="simple" order="">
        <ui>
            <select1 name="Name">
                <option>John Smith</option>
                <option>John Kerry</option>
                <option>Edward North</option>
                <option>Ben Frenkel</option>
            </select1>
        </ui>
    </Name>
    <CreatedDate type="simple"/>
    <CreatedBy type="simple"/>
    <Expense>
        <Amount type="simple"/>
        <Description type="simple"/>
        <Party>
            <Name type="simple"/>
            <Surname type="simple"/>
        </Party>
    <Expense>
</ExpenseReport>
```

---

Based upon the updated definition for the Name field in the information structure and the constraint specified in the meta-information structure that select 1 tag equates to a drop-down where only one value can be selected, the App Generator 40 would automatically generate screen 600 to show the Name data field as a drop-down as opposed to an input text field as shown in FIG. 6.

It will be appreciated that the overall layout, configuration and functionality of screen 600 is exemplary and does not in any way limit the software development methods/techniques and apparatus described herein.

Described herein are methods and systems meeting the objects set forth above, among others. It will be appreciated that the illustrated embodiments and those otherwise discussed herein are merely examples of the invention and that other embodiments, incorporating changes thereto, fall within the scope of the invention, of which

We claim:

1. A computer-implemented method for generating one or more components of a software application comprising:
   providing input data to an application generator through a user interface, wherein said input data defines an information structure for the software application, wherein the information structure specifies a hierarchical data structure specifying at least one complex object with at least one embedded simple object such that the complex object correlates to a step in a workflow and the simple object correlates to a data field included in the step of the workflow;
   applying one or more constraints to the input data using the application generator, wherein the one or more constraints embody one or more rules related to conversion of the information structure into the one or more components of the software application; and
   generating, using the application generator, the one or more components of the software application, wherein the one or more components include at least the workflow.

2. The method of claim 1, wherein the workflow includes one or more process actions.

3. The method of claim 1, wherein the data field is specified to be input through an interface during execution of the software application, and wherein a second data field is specified to be calculated using a function or expression during execution of the software application.

4. The method of claim 2, wherein a first of the one or more process actions specifies a trigger event for process state transitions.

5. The method of claim 4, wherein said trigger event comprises any of modifying a data field during a step of the workflow and a user action with respect to a user interface displaying a step of the workflow during execution of the software application.

6. The method of claim 1, wherein rules related to any of defining the hierarchical data structure and converting the hierarchical data structure into the workflow are embodied in the one or more constraints.

7. The method of claim 1, wherein the one or more components include at least one database table for each complex object and at least one column for each simple object.

8. The method of claim 7, wherein any of said database table and column store one or more values for instances of objects created during execution of the software application.

9. The method of claim 1, wherein the information structure can be any of graphically created and graphically manipulated through the user interface.

10. The method of claim 1, further comprising:
    defining a meta-information structure using a programming language; and processing the meta-information structure to create the application generator, wherein the meta-information structure specifies at least a first portion of the one or more constraints and the information structure specifies one or more additional constraints.

11. The method of claim 10, wherein the processing of the meta-information structure includes any of compiling, interpreting and just-in-time compiling the meta-information structure.

12. The method of claim 10, wherein the first portion of the one or more constraints specifies at least one default configuration setting that is overridden by another setting specified by the one or more additional constraints.

13. The method of claim 1, wherein said one or more components include any of a process definition, a user interface layout, a user interface configuration, a database component, and a security setting describing a privilege related to performing operations on data elements.

14. A system having a memory, the system comprising:
an application generator comprising executable program instructions that define one or more constraints, wherein said one or more constraints embody one or more rules for converting an information structure into one or more components of a software application;
a digital data processor executing said executable program instructions to:
   i. provide a user interface;
   ii. accept input data that defines the information structure, wherein the information structure specifics a hierarchical data structure specifying at least one complex object with at least one embedded simple object such that the complex object correlates to a step in a workflow and the simple object correlates to a data field included in the step of the workflow;
   iii. apply the one or more constraints to said input data to generate the one or more components of the software application, wherein the one or more components include at least the workflow.

15. The system of claim 14, wherein the digital data processor can be any of a client processor and a server processor and the user interface is provided on any of the client processor and the server processor.

16. The system of claim 15, wherein the client processor and the server processor operate in any of a thin client, thick client, rich client and cloud computing environments.

17. The system of claim 14, wherein the input data is provided to the application generator using an upload feature.

18. The system of claim 17, wherein the input data is included in an XML file.

* * * * *